(12) United States Patent
Martin et al.

(10) Patent No.: US 11,617,304 B2
(45) Date of Patent: Apr. 4, 2023

(54) STAGGERED HARVESTER HEAD REEL POSITION ADJUSTMENT

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 630 days.

(21) Appl. No.: 16/664,006

(22) Filed: Oct. 25, 2019

(65) Prior Publication Data

US 2021/0120740 A1    Apr. 29, 2021

(51) Int. Cl.
| | | |
|---|---|---|
| A01D 57/04 | (2006.01) | |
| A01D 69/02 | (2006.01) | |
| A01D 69/03 | (2006.01) | |
| A01D 41/14 | (2006.01) | |

(52) U.S. Cl.
CPC ............. *A01D 57/04* (2013.01); *A01D 41/14* (2013.01); *A01D 69/02* (2013.01); *A01D 69/03* (2013.01)

(58) Field of Classification Search
CPC ........ A01D 57/04; A01D 69/02; A01D 69/03; A01D 41/14; A01D 57/02; A01D 57/025
See application file for complete search history.

(56) References Cited

U.S. PATENT DOCUMENTS

| | | | | |
|---|---|---|---|---|
| 3,599,410 A | * | 8/1971 | de Coene | A01D 57/04 56/221 |
| 3,945,180 A | * | 3/1976 | Sinclair | A01D 57/04 56/221 |
| 4,124,970 A | | 11/1978 | Bernhardt | |
| 4,407,109 A | * | 10/1983 | Swanson | A01D 57/02 137/99 |
| 4,655,031 A | | 4/1987 | Kucera | |
| 6,138,447 A | * | 10/2000 | Stivers | A01D 57/02 56/14.4 |

(Continued)

FOREIGN PATENT DOCUMENTS

| | | | | |
|---|---|---|---|---|
| EP | 1055360 A1 | * | 11/2000 | ............. A01D 57/02 |
| EP | 1472925 A1 | * | 11/2004 | ............. A01D 34/53 |
| EP | 3420801 A1 | | 1/2019 | |

OTHER PUBLICATIONS

Extended European Search Report for EP Application No. 20203971.5 dated Mar. 17, 2021 (five pages).

*Primary Examiner* — Alicia Torres
(74) *Attorney, Agent, or Firm* — Peter Zacharias; Patrick Sheldrake (57) ABSTRACT

An agricultural header having a frame, a first support arm, a second support arm spaced from the first support arm, a reel extending from a first reel end rotatably mounted to the first support arm to a second reel end rotatably mounted to the second support arm, a first actuator operatively connected to the frame and the first support arm and configured to move the first support arm relative to the frame, a second actuator operatively connected to the frame and the second support arm and configured to move the second support arm relative to the frame, and a control system configured to alternately operate the first actuator and the second actuator in repeating alternating incremental steps to thereby move the reel from a first reel position relative to the frame to a second reel position relative to the frame. A combine having such a header is also provided.

24 Claims, 5 Drawing Sheets

(56) References Cited

U.S. PATENT DOCUMENTS

| | | | |
|---|---|---|---|
| 6,442,918 B1* | 9/2002 | Fox | A01D 57/04 |
| | | | 56/220 |
| 7,730,707 B2* | 6/2010 | Pietricola | A01D 41/148 |
| | | | 56/221 |
| 7,866,132 B2 | 1/2011 | Killen et al. | |
| 10,321,631 B2* | 6/2019 | Noll | A01D 57/04 |
| 10,462,966 B2* | 11/2019 | Smith | A01D 41/141 |
| 2007/0204583 A1* | 9/2007 | Coers | A01D 61/002 |
| | | | 56/14.4 |
| 2007/0289278 A1* | 12/2007 | Coers | A01D 57/02 |
| | | | 56/14.4 |
| 2009/0107094 A1* | 4/2009 | Bich | A01D 41/141 |
| | | | 56/10.2 E |
| 2012/0055135 A1* | 3/2012 | Brockhan-Luedemann | |
| | | | A01F 29/095 |
| | | | 56/249.5 |
| 2016/0255773 A1 | 9/2016 | Rayfield et al. | |
| 2018/0092305 A1 | 4/2018 | Cook et al. | |
| 2019/0003495 A1* | 1/2019 | Hunt | A01D 41/141 |
| 2019/0003496 A1* | 1/2019 | Hunt | A01B 63/10 |
| 2019/0082599 A1 | 3/2019 | Cook | |

* cited by examiner

STAGGERED HARVESTER HEAD REEL POSITION ADJUSTMENT

BACKGROUND OF THE INVENTION

Agricultural harvester heads are used to remove crop material from the ground and convey such material into the harvester for further processing. For example, a harvester head might include a cutter bar assembly to sever the crop stalks, and one or more conveyors such as augers or belts to consolidate the crop material at the center of the header. The header also may include one or more harvesting reels, such as pickup reels, draper reels and gathering reels, to help guide the crop into the header.

A typical reel is mounted to the header between support arms, and includes a rotating shaft to which tine rods or bars are attached to sweep crop material backwards over the cutter bar assembly and towards the back of the header. The rotating components (shaft, tines, etc.) of the reel may have any suitable configuration for moving the crop backwards to the header. Non-limiting examples of reel structures are shown in U.S. patent application Ser. No. 15/058,853 (U.S. Publication 2016/0255773), and U.S. patent application Ser. No. 15/710,523 (U.S. Publication 2019/0082599), which are incorporated herein by reference.

Wider headers may include multiple reels mounted side-by-side on respective support arms. Electric or hydraulic actuators are typically operatively connected to the support arms to move the reel sections fore and aft and up and down. Non-limiting examples of such actuators are shown in U.S. patent application Ser. No. 15/285,982 (U.S. Publication 2018/0092305), which is incorporated herein by reference.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural header having a frame, a first support arm, a second support arm spaced in a lateral direction from the first support arm, a reel extending from a first reel end rotatably mounted to the first support arm to a second reel end rotatably mounted to the second support arm, a first actuator operatively connected to the frame and the first support arm and configured to move the first support arm relative to the frame, a second actuator operatively connected to the frame and the second support arm and configured to move the second support arm relative to the frame, and a control system configured to alternately operate the first actuator and the second actuator in repeating alternating incremental steps to thereby move the reel from a first reel position relative to the frame to a second reel position relative to the frame.

In some exemplary aspects, the first actuator comprises first hydraulic actuator and the second actuator comprises a second hydraulic actuator.

In some exemplary aspects, the control system comprises a source of pressurized hydraulic fluid.

In some exemplary aspects, the control system comprises at least one valve moveable between a first valve position in which the source of pressurized hydraulic fluid is fluidly connected to the first hydraulic actuator and not fluidly connected to the second hydraulic actuator, and a second valve position in which the source of pressurized hydraulic fluid is fluidly connected to the second hydraulic actuator and not fluidly connected to the first hydraulic actuator.

In some exemplary aspects, the at least one valve comprises a hydraulic diverter valve.

In some exemplary aspects, the actuator drive comprises a solenoid operatively connected to the at least one valve and configured to move the at least one valve between the first position and the second position.

In some exemplary aspects, the first actuator comprises a first electric actuator and the second actuator comprises a second electric actuator.

In some exemplary aspects, the control system comprises a source of electrical energy.

In some exemplary aspects, the control system comprises a control circuit configured to alternate between: connecting the source of electrical energy to drive the first electric actuator and not drive the second electric actuator, and connecting the source of electrical energy to drive the second electric actuator and not drive the first electric actuator.

In some exemplary aspects, wherein the first electric actuator and the second electric actuator comprise linear actuators.

In another exemplary aspect, there is provided an agricultural vehicle having a chassis configured for movement over a surface, and a header as described in the previous exemplary embodiments.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide apparatus and methods for operating a header reel position control system. It will be appreciated that other embodiments may be used in other types of machines having a similar arrangement of parts, upon incorporation of the appropriate features of the inventions herein.

Figure 1:
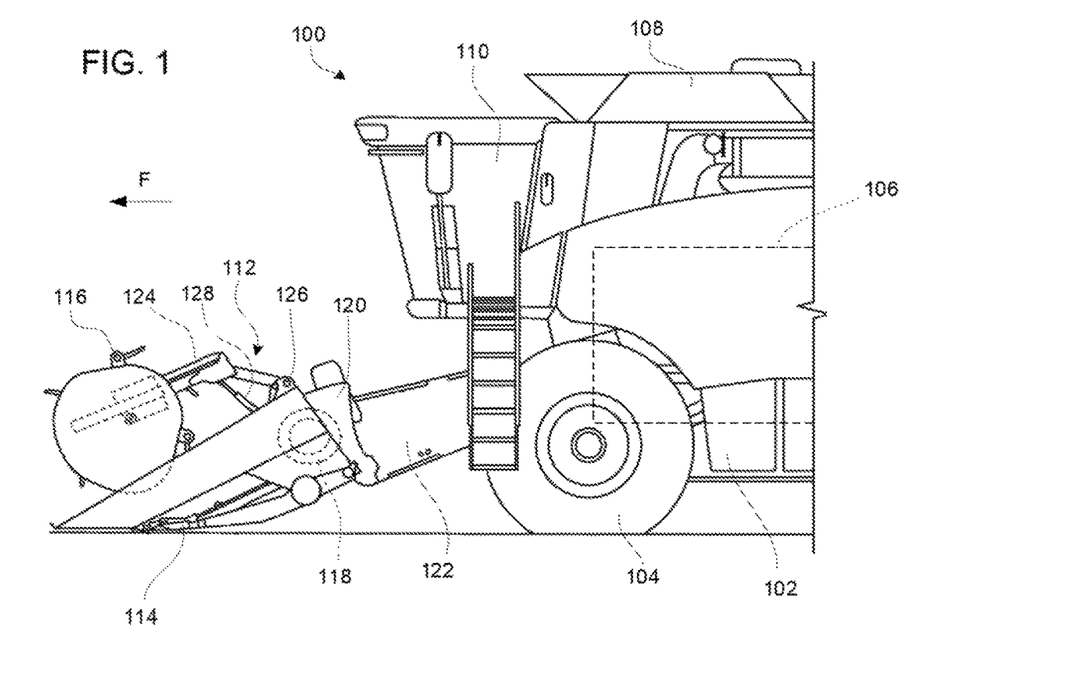
FIG. 1 is a side elevation view of an agricultural vehicle that may include embodiments of the present invention.
Figure 2:
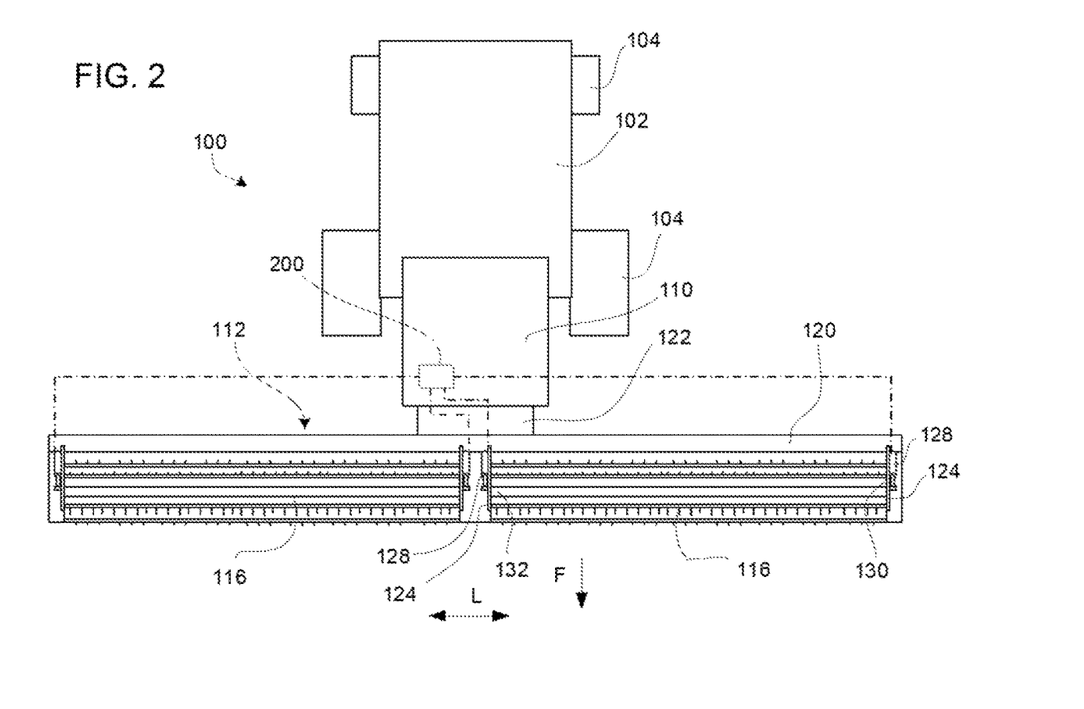
FIG. 2 is a top plan view of the agricultural vehicle of FIG. 1.

FIGS. 1 and 2 illustrate an example of an agricultural combine 100 with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper 108 and unloader. Threshing and separating systems 106 and their associated components are well-known in the art, and need not be described in detail herein. The combine 100 also may include other features, such as an operator cab 110, and so on.

A header 112 is attached to the chassis 102, typically at the forward end of the combine 100. The header 112 is configured to cut and harvest crop material from the ground as the combine 100 drives in the forward direction F. The header 112 extends in the lateral direction L relative to the chassis 102. The term "lateral" will be understood to mean a direction that is transverse to the forward drive direction F. The header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws (as shown), or the like. At the center, the header 112 may include a feeder conveyor (not shown) that conveys the crop material backwards towards a crop outlet. The header 112 also may include supports in the form of gauge wheels or skids to control the height of the header 112 over the ground.

The header 112 is built on a frame 120, which is attached to the chassis 102 by a feeder housing 122. The feeder housing 122 is configured to convey crop material backwards from the header 112 to the threshing and separating system 106. The feeder housing 122 may be movable by one or more actuators (not shown) to change the position of the header 112 relative to the ground.

The reels 116 are movably mounted to the frame 120 by support arms 124. The support arms 124 are spaced in the lateral direction L along the frame 120, and connected to the frame 120 by movable joints, such as pivot connectors 126. Each support arm has an associated actuator 128, such as a hydraulic piston and cylinder arrangement, or an electric actuator (e.g., an electrically operated lead screw-driven actuator). The actuators 128 may be operatively connected between the frame 120 and the respective support arm 124 by pivot connectors at each end of the actuator 128, or by other articulated connections, as known in the art.

Each reel 116 is connected at a first reel end 130 to a first one of the support arms 124, and at a second reel end 132 to a second one of the support arms 124. It will also be understood that a single support arm 124 may be located between and connected to two reels 116 (i.e., one reel 116 extending from each side of the support arm 124) Thus, a header 112 may include, for example: a single reel 116 supported by two support arms 124; two reels 116 supported by three support arms 124 with the center support arm 124 holding both reels 116; two reels 116 supported by four support arms 124 (i.e., two support arms 124 per reel 116); three reels 116 supported by four, five or six support arms 124, and so on. The reels 116 furthermore are rotatably mounted relative to the support arms 124, such that the reels 116 can rotate to drive crop material into the header 112. Such rotating mount may be by conventional bearings or the like, as known in the art. One or more motors (not shown), such as electric or hydraulic motors, or a power take-off from the vehicle's main power plant, may be provided to drive the reels 116. The particular structure of the reels 116 and their rotational drive system are not relevant to the invention, and need not be described in more detail herein.

The actuators 128 are operable to move the support arms 124 relative to the frame 120, to thereby move the reels 116 relative to the frame 120. In the example of FIG. 1, the actuators 128 move the reels 116 generally up and down (i.e., vertically). In other examples, the actuators 128 may be configured to move the reels 116 in the fore-aft direction (i.e., longitudinally). Still other examples may have multiple actuators at each support arm 124, that are configured to control the position of the reel 116 relative to the frame 120 both vertically and longitudinally.

The reel actuators 128 are operated by a control system 200 comprising one or more electrical or hydraulic power supplies, actuators, switches or the like. It has been found that conventional reel actuator 128 operating systems can have limitations. For example, if electric actuators are used, the total power draw on the electrical system to simultaneously operate all of the electric actuators can be significant, leading to additional costs to ensure full operational capacity of all such actuators. Similarly, a vehicle 100 originally configured to operate a single reel may lack sufficient power to operate multiple reels provided on a retrofit header. As another example, when hydraulic actuators are used, each actuator must have its own relatively complex and expensive hydraulic valve assembly to allow independent operation of the reels, and requires a larger capacity hydraulic system. When retrofitting a header with a second reel (or more) onto a vehicle having a single reel, the hydraulic system may be underpowered or lack hydraulic capacity to operate all of the reel actuators. The need for such complex and expensive hydraulics can be avoided by connecting the actuators to operate in parallel, but this removes the ability to individually position each end of the reel 116 to optimize performance, and requires a large instantaneous hydraulic volumetric flow capacity.

It has been determined that the foregoing problems can be mitigated or eliminated by using a control system 200 that is configured to alternately operate the two reel actuators 128 of each reel 116 in a plurality of repeating alternating incremental steps when it is desired to move the reel 116 relative to the header frame 120. Using this process, the reel 116 is moved from a first operating position to second operating position by staggering the movement of the two support arms 124. The support arms 124 are operated one at a time (possibly with some overlap of their duty cycles), through a series of small steps to reach the final desired operating position.

Figure 3:
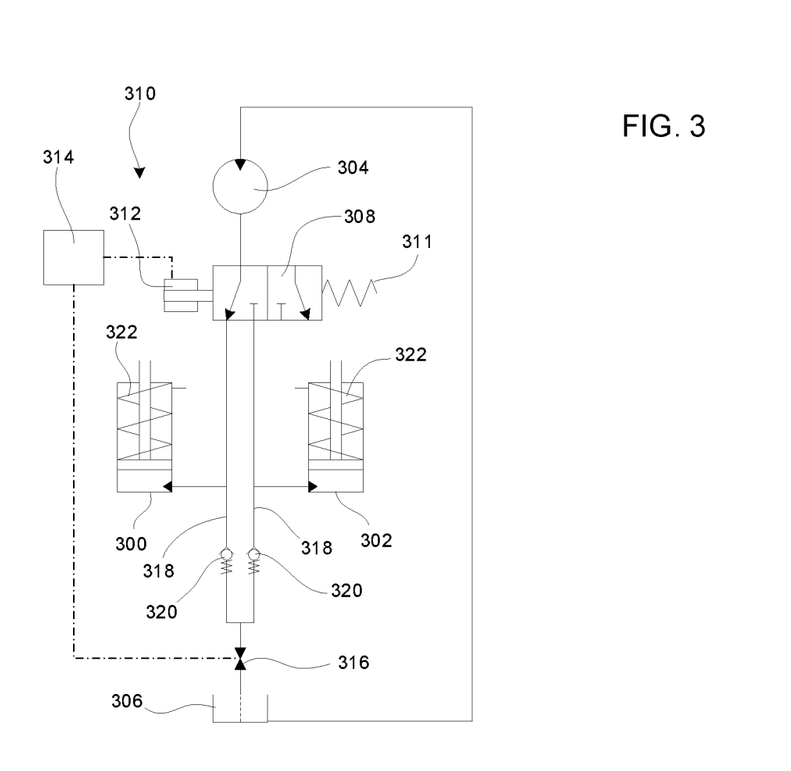
FIG. 3 is a schematic diagram of an exemplary reel support arm control system.

A first example of such a control system 200 is illustrated in FIG. 3. The control system includes a first actuator 300 and a second actuator 302, each of which is configured to operate a respective reel support arm 124. The first and second actuators 300, 302 each comprise a hydraulic piston and cylinder actuator assembly, as known in the art. In this case, the actuators 300, 302 are single-acting hydraulic actuators. The control system 200 further includes a source of pressurized hydraulic fluid, such as a pump 304 connected to a hydraulic fluid reservoir 306, and a valve 308. The valve 308 is configured to selectively direct the pressurized hydraulic fluid to one or the other of the two actuators 300, 302 to cause the selected actuator 300, 302 to extend. The valve 308 may comprise any suitable diverter valve, such as a spool valve or a valve block having the requisite flow passage arrangement.

A valve controller 310 is provided to operate the valve 308. The valve controller 310 may comprise, for example, an electrically-operated solenoid 312 that drives the valve 308 to a first position (shown) when energized, and a spring 311 that drives the valve 308 to a second position (to the left in FIG. 3) when the solenoid 312 is de-energized. The spring 311 may be replaced by a second solenoid acting in the opposite direction, or other return mechanisms. The valve controller 310 alternatively may comprise an eccentric drive linkage that is reciprocated back and forth by a motor, a cam and follower mechanism, a Geneva wheel drive or any other mechanism suitable for moving the valve between the first and second positions, preferably with a controlled dwell time at each position to ensure the desired hydraulic fluid flow duration.

The valve controller 310 is operated by any suitable controller 314, such as a digital circuit (e.g., a microcontroller or the like) to repeatedly cycle between the first and second positions. In the case of the solenoid example shown in FIG. 3, the controller 314 may be programmed to cycle the solenoid 312 on and off at a predetermined frequency or duty cycle to operate the two actuators 300, 302 in repeating alternating incremental steps. Where a motor-driven valve switching mechanism is used (e.g., cam and follower, Geneva wheel, etc.), the controller 314 may be configured to drive the motor at a speed necessary to obtain the desired step duration. If the motor is a fixed-speed motor, the controller 314 may be programmed to simply turn the motor on or off (e.g., it may be a simple switch), and the desired step duration may be obtained by configuring the drive mechanism with the proper gear ratio, as understood in the art.

The step duration may be selected according to various criteria. For example, the step duration may be selected to ensure that the magnitude of differential displacement caused by the motion of one actuator while the other remains idle (which may cause some flexing of parts such as the reel 116 and support arms 124) is not great enough to damage or wear the parts. The step duration also may be selected to make the step-wise motion of the arms imperceptible or difficult to perceive by the operator. The step duration also may be selected based on an empirical analysis of the effect of different durations on energy efficiency of the system (e.g., power draw or heat generation to operate at one switching frequency versus another switching frequency). The step duration preferably is selected to ensure that multiple steps are required to move the reel 116 between typical operating positions. For example, if the reel 116 is designed to operate through a 12 inch range of motion, the step duration may be selected to ensure a minimum number of incremental steps are taken to move through the 12-inch range or a portion thereof (e.g., 1 step per inch, 20 steps per inch, etc.). The step duration also may be established based on other considerations, such as reducing noise generation and vibrations.

In the embodiment of FIG. 3, the reel 116 is lowered by opening a drain valve 316, which may be done manually or under the control of the controller 314. While a separate drain valve 316 may be used for each actuator 300, 302 (see, e.g., FIG. 5), the drain valve 316 is in this case attached to both hydraulic pressure lines 318 leading to the two actuators 300, 302 via respective check valves 320. The check valves 320 prevent backflow from one actuator to the other during extension of the actuators 300, 302. Opening the valve 316 drains both actuators 300, 302 simultaneously. Thus, the lowering operation may be performed simultaneously at both support arms 124 without performing repeating alternating incremental steps.

It will be appreciated that the foregoing embodiment may be modified in various ways. For example the actuators 300, 302 may be balanced against springs 322 (internal or external to the actuators 300, 302) that lift the support arms 124, such that the actuators 300, 302 are configured to push the support arms 124 down against the bias of the springs 322. In this example, the repeating alternating incremental control steps provided by the valve controller 310 would operate to lower the reel 116, and the springs 322 would raise both ends of the reel 116 simultaneously upon opening the valve 316. Such an embodiment may also be used to operate fore-aft actuators in which reverse operation cannot be accomplished by using gravity to pull the reel support arms 124 down.

Figure 4:
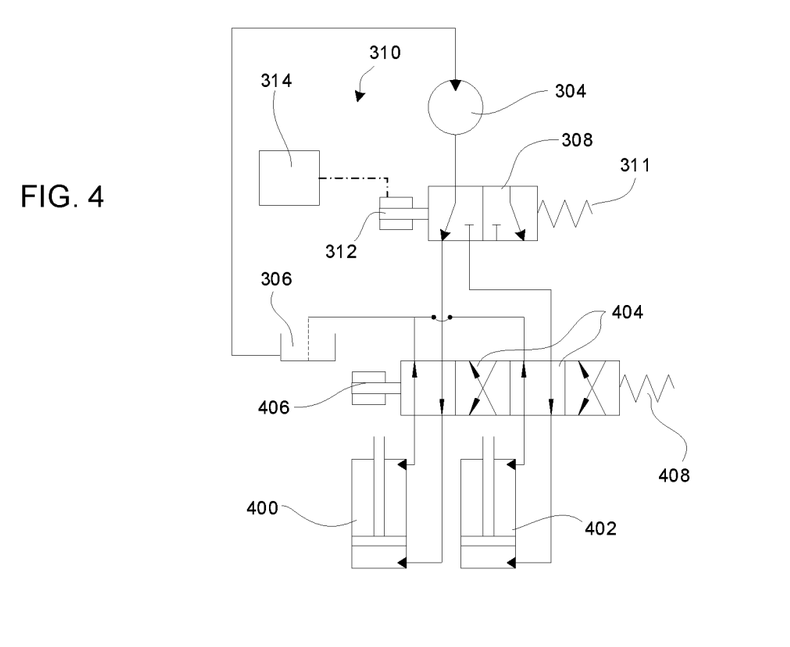
FIG. 4 is a schematic diagram of another exemplary reel support arm control system.

FIG. 4 illustrates another version of a hydraulic actuator system, in which the hydraulic actuators 400, 402 are double-acting hydraulic piston and cylinder assemblies. This example is the same in some respects as the example of FIG. 3, but a pair of 4-port crossover valves 404 are provided to selectively switch between extending and retracting the actuators 400, 402, and it is not necessary to provide a drain valve. The crossover valves 404 for each actuator 400, 402 may be operated simultaneously (as shown), or independently. Control may be by a solenoid 406 and return spring 408, such as described above for the diverter valve 308, or via other hydraulic valve switching mechanism. Any suitable valve structure may be used for the crossover valves 404.

Figure 5:
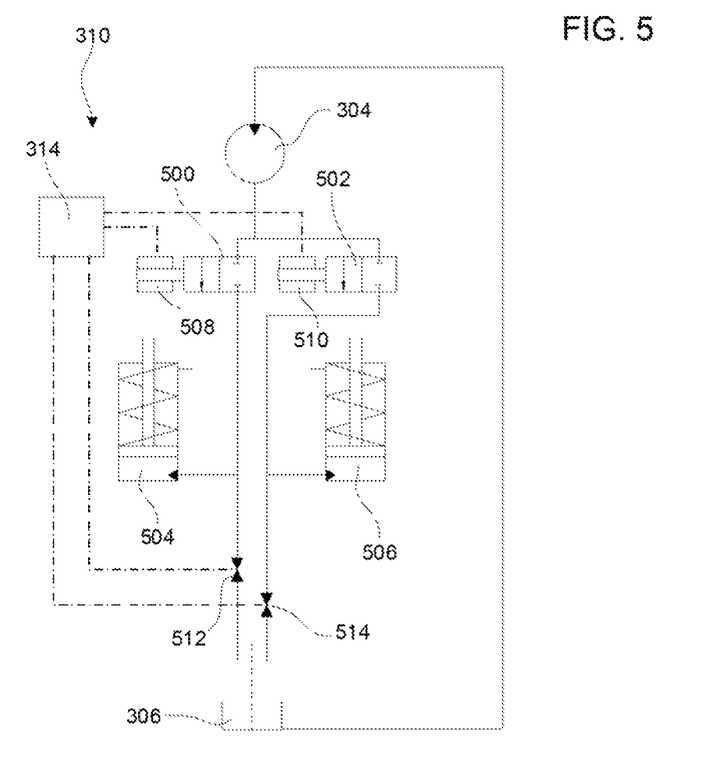
FIG. 5 is a schematic diagram of another exemplary reel support arm control system.

In each of the foregoing examples, the diverter valve 308 may be replaced by a separate flow control valve for each hydraulic actuator. For example, FIG. 5 illustrates an example of a hydraulic circuit in which a separate control valve 500, 502 is provided for each hydraulic actuator 504, 506. The hydraulic actuators 504, 506 are single-acting in this case, but could be double-acting in other examples. Each control valve 500, 502 is operated by a valve controller, such as a solenoid 508, 510. Similarly, each actuator 504, 506 may have a separate drain valve 512, 514, which allows the operator to lower (or reverse against a biasing spring) one end of the reel independently of the other. Alternatively, a single drain valve may be used such as in the embodiment of FIG. 3.

In this example, the two control valves 500, 502 may be operated independently by separate signals from the controller 314. The controller 314 may be programmed to operate the valves 500, 502 in discrete alternating incremental steps that do not overlap. Alternatively, the incremental steps may overlap to some degree, which may be desirable to accelerate the reel movement process. In either case, the valves 500, 502 are movable between a first valve position in which the source of pressurized hydraulic fluid 304 is fluidly connected to the first hydraulic actuator 504 and not fluidly connected to the second hydraulic actuator 506, and a second valve position in which the source of pressurized hydraulic fluid 304 is fluidly connected to the second hydraulic actuator 506 and not fluidly connected to the first hydraulic actuator 504. The controller 314 also may be programmed to allow an override mode in which both valves 500, 502 are operated in unison to simultaneously raise both reel support arms 124. This mode may be useful during service operations or other operations in which the hydraulic system of the header and vehicle is not otherwise loaded or has excess capacity that allows efficient simultaneous operation of both actuators.

It will be appreciated that, in other embodiments, the two control valves 500, 502 may be operated in unison by a single valve controller, such as in the manner the ganged crossover valves 404 are operated in the embodiment of FIG. 4. In this case, the actuators 504, 506 could not be operated in an overlapping or simultaneous manner. Similarly, the embodiments of FIGS. 3 and 4 may be modified by providing separately-controlled flow valves to each actuator, such as in FIG. 5, to allow overlapping or simultaneous operation of the actuators. Other alternatives and variations will be apparent to persons of ordinary skill in the art in view of the present disclosure.

In other embodiments, the hydraulic reel support arm actuators may be replaced by other mechanisms, such as electric actuators. An exemplary electric actuator is a linear actuator having an electric motor configured to drive a lead screw to cause a follower nut to move in a linear fashion along the lead screw. Other non-limiting examples of electric actuators include: recirculating ball linear actuators; cable-, belt- or chain-drives; motor-driven linkages; and the like. In each case, an electric motor is used to operate the actuator, which generates an operating load on the vehicle's electrical system. The magnitude of the load is reduced by operating the electric actuators in a plurality of repeating alternating incremental steps.

Figure 6:
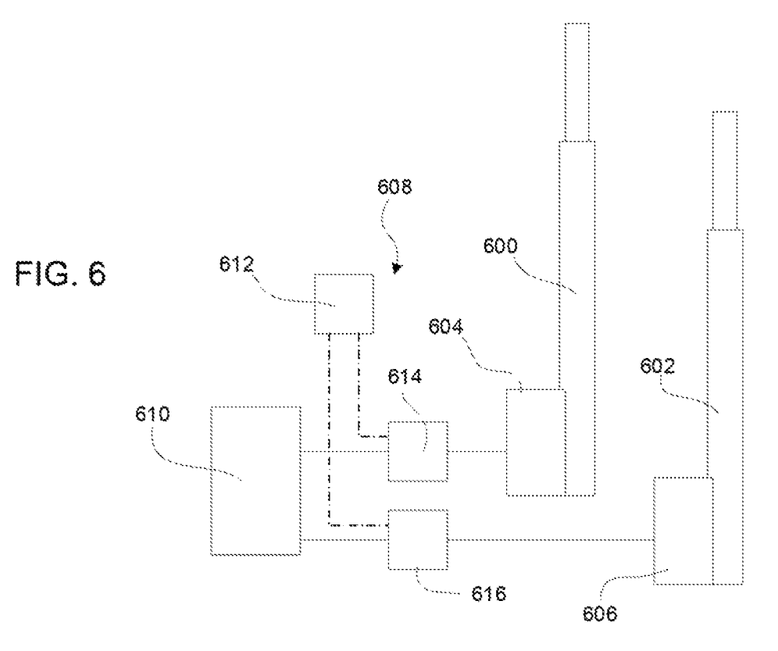
FIG. 6 is a schematic diagram of another exemplary reel support arm control system.

FIG. 6 is an example of a reel positioning system using an electric actuator. In this case, the electric actuators 600, 602 comprise linear motion mechanisms (e.g., lead screws), that are driven by respective motors 604, 606. A control system 608 is provided to control the distribution of electric power from a source of electrical energy 610 to the electric actuators 600, 602. The power source 610 may comprise one or more batteries, generators (e.g., an alternator driven by a prime mover internal combustion engine, or a dedicated electric generator and motor system), capacitors, or the like.

The control system 608 is programmed to selectively connect each electric actuator 600, 602 to the power source 610. For example, the control system 608 may have a microprocessor 612 that controls the respective gate functions of a separate electric switch 614, 616 for each electric actuator 600, 602. Such switches 614, 616 may be solenoid-operated switches, solid state switching devices such as MOSFETs (Metal Oxide Semiconductor Field Effect Transistor), or any other suitable electrical energy switching mechanism. The switches 614, 616 may be separate parts, or integrated in to the control system 608.

In use, the control system 608 selectively activates the switches 614, 616 to repeatedly cycle the control circuit between a first state in which the power source 610 is connected to drive the first electric actuator 600 and not connected to drive the second electric actuator 602, and a second state in which the power source 610 is connected to drive the second electric actuator 602 and not connected to drive the first electric actuator 600. Thus, for at least a period of time in each cycle, one or the other of the electric actuators 600, 602 is not being operated. In this way, the electric actuators 600, 602 are operated in a plurality of repeating alternating incremental steps to drive the support arms 124 and move the reel 116 from a starting position to a finishing position.

This cyclical operation of the electric actuators 600, 602 reduces the electric current draw required to move the reel 116, and thus reduces operating loads on the electrical system. The power requirement of the system may be minimized by operating the control system 608 such that the duty cycles of the two electric actuators 600, 602 do not overlap at all (i.e., there are no transient periods between the first state and the second state described above, in which the power source 610 electrically driving both actuators 600, 602), but this is not strictly required. The control system 608 also may be configured to selectively operate both electric actuators 600, 602 simultaneously (i.e., without operating them in repeating alternating incremental steps), when such operation would not overstress the electrical system. For example, such operation may be useful during service or during transport when other electrical loads are reduced.

As will be appreciated from the foregoing examples, embodiments are capable of providing independent position control of each end of a reel 116, while reducing the overall complexity and cost of the system, reducing power requirements, or providing other benefits. When it is desired to move one end of the reel 116, a single end can be operated independently, and when it is desired to move both ends of the reel 116, the two ends can be used without any more or substantially more power requirement than moving a single end.

Figure 7:
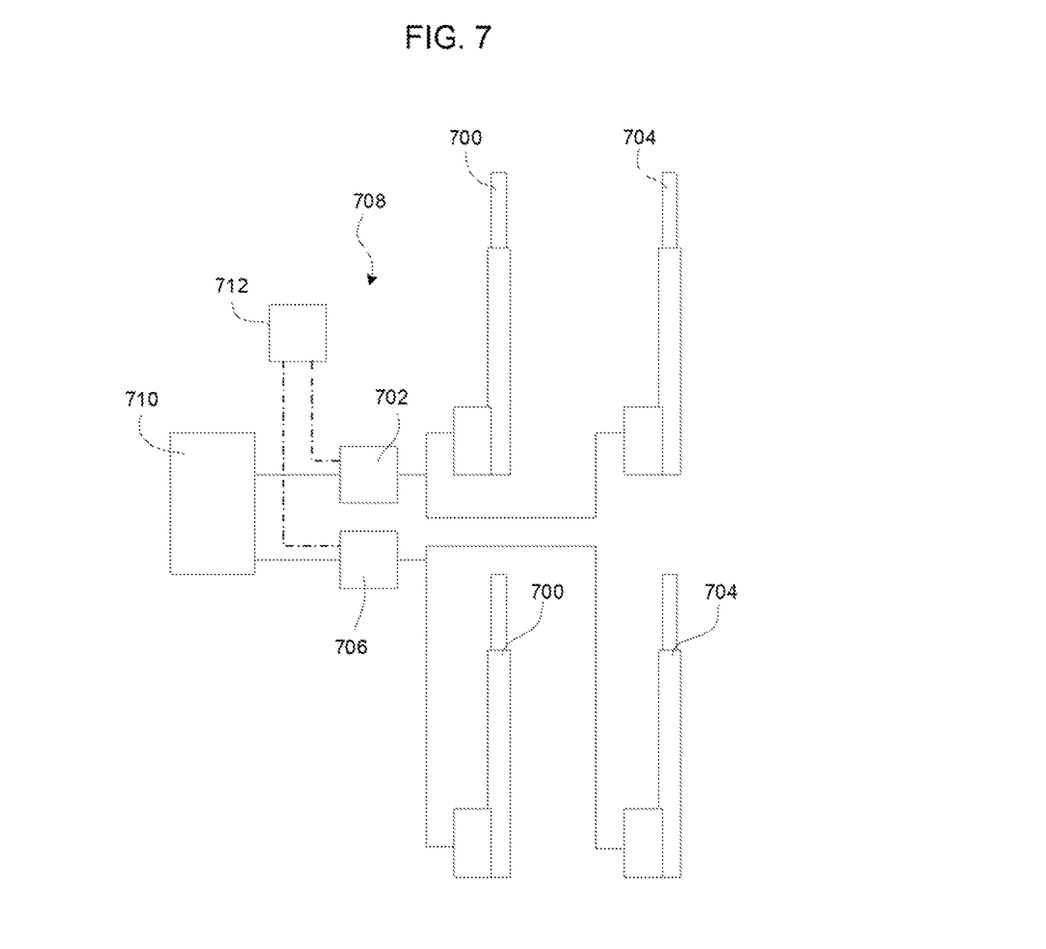
FIG. 7 is a schematic diagram of another exemplary reel support arm control system.

In headers having multiple reels, each reel may have a system as described herein, or all of the reels may be connected to a single operating system that selectively operates one actuator for each reel or selective groups of actuators for multiple reels, to avoid overloading the system. For example, FIG. 7 shows an example in which the respective left actuators 700 for two separate reels are driven by a first switch 702, and the respective right actuators 704 for the reels 116 are driven by a second switch 706. Thus, the two reels can be simultaneously moved in the same series of repeating alternating incremental steps by operating a control system 708 to alternately connect the first switch 702 and the second switch 706 to the power source 710. Still further, the first switch 702 may comprise a pair of separate switches (one for each left actuator 700) that may be selectively operated independently of each other, and the second switch 706 may comprise a pair of separate switches (one for each right actuator 704) that may be selectively operated independently of each other, to thereby allow the operator to move any one of the actuators 700, 704 independently of the others. As with the embodiment of FIG. 6, any suitable control circuitry may be used as the control system 708, such as a suitably programmed microcontroller 712 that is operatively connected to the switches 702, 706.

A configuration such as the one in FIG. 7 can have many uses, and may be used in conjunction with a header as shown in FIG. 2 having two support arms 124 and actuators 128 per reel 116. This embodiment also may be particularly useful when retrofitting a header having two reels to a vehicle designed to operate a single reel. It will also be appreciated that the hydraulic circuits described herein can also be modified to operate gangs of actuators in unison, or to operate more than two actuators in separate steps. Other alternatives and variations will be apparent to persons of ordinary skill in the art in view of the present disclosure.

Figure 8:
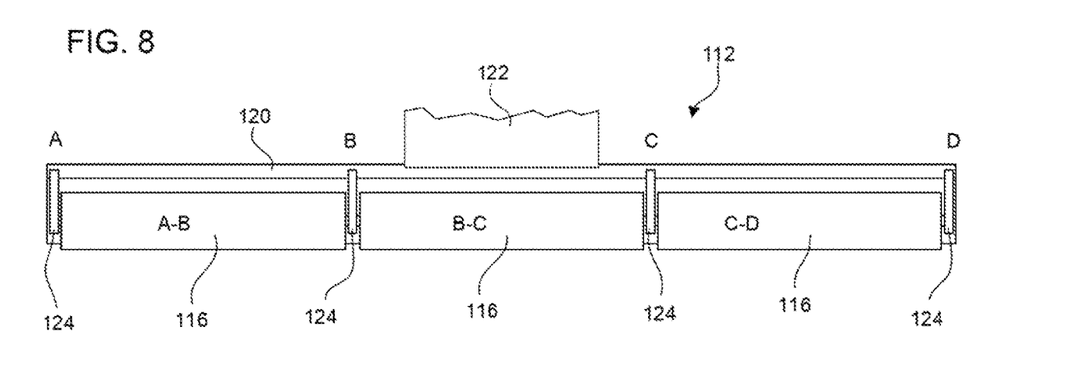
FIG. 8 is a schematic top plan view of an agricultural vehicle header.
Figure 9:
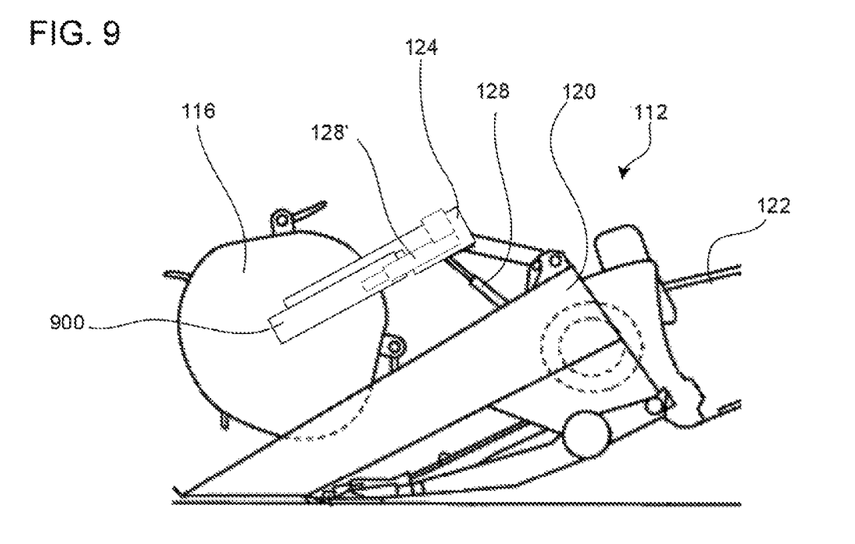
FIG. 9 is a side elevation view of the header of FIG. 8.

FIGS. 8 and 9 show another embodiment in which a header 112. In this case, the header 112 has three reels 116 supported on four support arms 124. Each support arm 124 has two actuators 128, 128'. The first actuator 128 is an elevation actuator that is connected between the frame 120 and the support arm 124 to control vertical movement of the reel 116. The second actuator 128' is a longitudinal actuator that is connected between the support arm 124 and a slidable reel end mount 900 that rotatably supports an end of the reel 116 and is movable generally in the fore-aft direction relative to the support arm 124 and the frame 120. Thus, between the two actuators, 128, 128', the reel 116 can be moved to virtually limitless positions relative to the frame 120 within a boundary defined by the ranges of motion of the two actuators 128, 128'.

An arrangement having a single actuator that controls the position of two reels 116 may be controlled using any of the foregoing embodiments. For example, each support arm 124 and its associated actuator may be identified as being at a certain position A, B, C, D on the header 112, with an associated reel A-B, B-C, C-D located therebetween. When it is desired to move a single reel (e.g., reel A-B), the actuators at the positions associated with that reel (e.g., positions A and B) may be operated in repeating alternating incremental steps to move the reel. If it is desired to move multiple reels (e.g., all three reels), then the actuators may be operated in a way that distributes the time sequence of the loading, such as by operating the actuators at each position in series (A, then B, then C, then D; or B then C, then A, then D; etc.). If the power capacity is not overloaded, then actuators at multiple locations may be operated in groups (e.g., A and C, then B and D; or A and D, then B and C; etc.).

When selecting the operating cycle, the different loadings of the actuators may be considered as part of the timing or step duration. For example, the actuators at positions B and C each bear the weight of two reel ends, whereas the actuators at positions A and D bear the weight of a single reel end. In this case, a more even distribution of operating power may be obtained by operating the actuators in a pattern that distributes the energy requirement based on the loading, such as by operating the actuators at positions B and C individually, but operating the actuators a positions A and D at the same time (e.g., A and D, then B, then C). Other alternatives and variations will be apparent to persons of ordinary skill in the art in view of the present disclosure.

When multiple actuators are provided for each control arm, such as elevation and longitudinal actuators 128, 128', other combinations of control systems may be used. In one example, the elevation and longitudinal actuators 128, 128' may be operated on completely different control systems (e.g., the elevation actuators 128 are on circuit as described above, and the longitudinal actuators 128' are on a separate circuit as described above). In this case, power requirements can be minimized by programming the controller(s) to be able to operate only the elevation actuators 128 or the longitudinal actuators 128' at any given time. Alternatively, the controls of all of the actuators may be integrated into a single control cycle, in which one or more elevation actuators 128 are operated in repeating alternating incremental steps with one or more longitudinal actuators 128' on the same control arm or on different control arms. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural header comprising:
a frame;
a first support arm;
a second support arm spaced in a lateral direction from the first support arm;
a reel extending from a first reel end rotatably mounted to the first support arm to a second reel end rotatably mounted to the second support arm;
a first actuator operatively connected between the frame and the first reel end and configured to move the first reel end relative to the frame;
a second actuator operatively connected between the frame and the second reel end and configured to move the second reel end relative to the frame; and
a control system configured to operate the first actuator without operating the second actuator and then operate the second actuator without operating the first actuator in repeating alternating incremental steps to thereby move the reel from a first reel position relative to the frame to a second reel position relative to the frame.

2. The agricultural header of claim 1, wherein the first actuator comprises first hydraulic actuator and the second actuator comprises a second hydraulic actuator.

3. The agricultural header of claim 2, wherein the control system comprises a source of pressurized hydraulic fluid.

4. The agricultural header of claim 3, wherein the control system comprises at least one valve moveable between a first valve position in which the source of pressurized hydraulic fluid is fluidly connected to the first hydraulic actuator and not fluidly connected to the second hydraulic actuator, and a second valve position in which the source of pressurized hydraulic fluid is fluidly connected to the second hydraulic actuator and not fluidly connected to the first hydraulic actuator.

5. The agricultural header of claim 4, wherein the at least one valve comprises a hydraulic diverter valve.

6. The agricultural header of claim 4, further comprising a solenoid operatively connected to the at least one valve and configured to move the at least one valve between the first valve position and the second valve position.

7. The agricultural header of claim 1, wherein the first actuator comprises a first electric actuator and the second actuator comprises a second electric actuator.

8. The agricultural header of claim 7, the control system comprises a source of electrical energy.

9. The agricultural header of claim 8, wherein the control system comprises a control circuit configured to alternate between: connecting the source of electrical energy to drive the first electric actuator and not drive the second electric actuator, and connecting the source of electrical energy to drive the second electric actuator and not drive the first electric actuator.

10. The agricultural header of claim 7, wherein the first electric actuator and the second electric actuator comprise linear actuators.

11. The agricultural header of claim 1, wherein the first actuator is connected between the frame and the first support arm, and the second actuator is connected between the frame and the second support arm.

12. The agricultural header of claim 1, wherein the first actuator is connected between the first reel end and the first support arm, and the second actuator is connected between the second reel end and the second support arm.

13. An agricultural vehicle comprising:
a chassis configured for movement over a surface; and
a header attached to the chassis, the header comprising:
a frame;
a first support arm;
a second support arm spaced in a lateral direction from the first support arm;
a reel extending from a first reel end rotatably mounted to the first support arm to a second reel end rotatably mounted to the second support arm;
a first actuator operatively connected between the frame and the first reel end and configured to move the first reel end relative to the frame;

a second actuator operatively connected between the frame and the second reel end and configured to move the second reel end relative to the frame; and a control system configured to operate the first actuator without operating the second actuator and then operate the second actuator without operating the first actuator in repeating alternating incremental steps to thereby move the reel from a first reel position relative to the frame to a second reel position relative to the frame.

14. The agricultural vehicle of claim 13, wherein the first actuator comprises first hydraulic actuator and the second actuator comprises a second hydraulic actuator.

15. The agricultural vehicle of claim 14, wherein the control system comprises a source of pressurized hydraulic fluid.

16. The agricultural vehicle of claim 15, wherein the control system comprises at least one valve moveable between a first valve position in which the source of pressurized hydraulic fluid is fluidly connected to the first hydraulic actuator and not fluidly connected to the second hydraulic actuator, and a second valve position in which the source of pressurized hydraulic fluid is fluidly connected to the second hydraulic actuator and not fluidly connected to the first hydraulic actuator.

17. The agricultural vehicle of claim 16, wherein the at least one valve comprises a hydraulic diverter valve.

18. The agricultural vehicle of claim 16, further comprising a solenoid operatively connected to the at least one valve and configured to move the at least one valve between the first valve position and the second valve position.

19. The agricultural vehicle of claim 13, wherein the first actuator comprises a first electric actuator and the second actuator comprises a second electric actuator.

20. The agricultural vehicle of claim 19, the control system comprises a source of electrical energy.

21. The agricultural vehicle of claim 20, wherein the control system comprises a control circuit configured to alternate between: connecting the source of electrical energy to drive the first electric actuator and not drive the second electric actuator, and connecting the source of electrical energy to drive the second electric actuator and not drive the first electric actuator.

22. The agricultural vehicle of claim 19, wherein the first electric actuator and the second electric actuator comprise linear actuators.

23. The agricultural vehicle of claim 13, wherein the first actuator is connected between the frame and the first support arm, and the second actuator is connected between the frame and the second support arm.

24. The agricultural vehicle of claim 13, wherein the first actuator is connected between the first reel end and the first support arm, and the second actuator is connected between the second reel end and the second support arm.

* * * * *